(12) United States Patent
Montgomery et al.

(10) Patent No.: US 7,831,816 B2
(45) Date of Patent: Nov. 9, 2010

(54) NON-DESTRUCTIVE SIDEBAND READING OF PROCESSOR STATE INFORMATION

(75) Inventors: Wallace P. Montgomery, Austin, TX (US); David F. Tobias, Pflugerville, TX (US); Michael T. Clark, Austin, TX (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 341 days.

(21) Appl. No.: 12/130,990

(22) Filed: May 30, 2008

(65) Prior Publication Data

US 2009/0300332 A1    Dec. 3, 2009

(51) Int. Cl.
G06F 9/312 (2006.01)
(52) U.S. Cl. ..................................................... 712/227
(58) Field of Classification Search ........................ None
See application file for complete search history.

(56) References Cited

U.S. PATENT DOCUMENTS

| | | | | |
|---|---|---|---|---|
| 5,530,804 | A * | 6/1996 | Edgington et al. ............. 714/30 |
| 5,802,359 | A * | 9/1998 | Webb et al. .................. 712/227 |
| 5,958,037 | A * | 9/1999 | Dreyer et al. .................. 712/32 |
| 6,453,344 | B1 * | 9/2002 | Ellsworth et al. ........... 709/220 |
| 6,735,660 | B1 * | 5/2004 | Osten et al. .................. 710/305 |
| 6,981,083 | B2 * | 12/2005 | Arimilli et al. .............. 710/260 |
| 7,210,131 | B2 * | 4/2007 | Schmidt et al. .............. 717/137 |
| 7,711,990 | B1 * | 5/2010 | Nickolls et al. ................ 714/37 |
| 2003/0097602 | A1 * | 5/2003 | Bigbee et al. ................ 713/500 |
| 2004/0153762 | A1 * | 8/2004 | Flynn et al. .................... 714/15 |
| 2004/0210760 | A1 | 10/2004 | McGrath et al. |
| 2005/0055524 | A1 | 3/2005 | Gulick et al. |
| 2008/0022052 | A1 * | 1/2008 | Sakugawa .................... 711/146 |
| 2008/0046695 | A1 * | 2/2008 | Ishizuka et al. .............. 712/214 |

OTHER PUBLICATIONS

U.S. Appl. No. 11/947,330, filed Nov. 29, 2007, entitled "Sideband Access Based Method and Apparatus for Determining Software Integrity," naming inventor Wallace Paul Montgomery.

(Continued)

*Primary Examiner*—Eric Coleman
(74) *Attorney, Agent, or Firm*—Zagorin O'Brien Graham LLP (57) ABSTRACT

A processor receives a command via a sideband interface on the processor to read processor state information, e.g., CPUID information. The sideband interface provides the command information to a microcode engine in the processor that executes the command to retrieve the designated processor state information at an appropriate instruction boundary and retrieves the processor state information. That processor information is stored in local buffers in the sideband interface to avoid modifying processor state. After the microcode engine completes retrieval of the information and the sideband interface command is complete, execution returns to the normal flow in the processor. Thus, the processor state information may be obtained non-destructively during processor runtime.

20 Claims, 5 Drawing Sheets

OTHER PUBLICATIONS

AMD "CPUID Specification," Advanced Micro Devices Publication #25481, Revision 2.26, Jul. 2007 (26 pages).

Zhuo, Haihong et al., "Remote Management with the Baseboard Management Controller in Eighth-Generation Dell PowerEdge Servers," Dell Power Solutions, Oct. 2004, pp. 26-29 (4 pages).

INTEL Datasheet, "System Management Feature Specifications," Dual-Core Intel® Itanium® Processor 9000 and 9100 Series Datasheet, Sec. 6, Oct. 2007, pp. 79-90 (14 pages).

INTEL Datasheet, "System Management Feature Specifications," Intel® Itanium® Processor at 800 MHz and 733 MHz Datasheet, Sec. 6, Aug. 2001, pp. 6-1 to 6-12 (14 pages).

U.S. Appl. No. 12/208,071, filed Sep. 10, 2008, entitled, "Method and Apparatus for Making Processor Sideband Interface Adhere to Secure Mode Restrictions," naming inventors Wallace Paul Montgomery, Andrew Lueck, and Geoffrey S. S. Strongin.

* cited by examiner

NON-DESTRUCTIVE SIDEBAND READING OF PROCESSOR STATE INFORMATION

BACKGROUND

1. Field of the Invention

This application relates to processor state information and more particularly to reading processor state information non-destructively from a sideband interface.

2. Description of the Related Art

Microprocessors have numerous storage elements that define the processor state. The state of the processor may include, e.g., general purpose registers, fixed and floating point registers, model specific registers, cache related registers, power control registers, test registers, machine-check registers, interrupt registers, timers, and status registers. The specifics of what defines the processor state depends on the particular processor. A processor state can be saved, e.g., prior to entering a power savings mode, and restored by reloading the processor state information. During operation, an unintended change to processor state can result in unpredictable behavior.

During debug, it is often desirable to obtain certain processor state information. That information can be provided over a debug interface, but that type of access typically requires that the processor be stopped in order to access internal processor information. That information in certain circumstances can be obtained without affecting processor state, e.g., by certain types of scan access. When utilizing traditional debug interfaces such as the AMD® hardware debug tool (HDT) debug interface and operating the processor in debug mode, processor type could be obtained on the debug interface. However, in that case reading processor type still requires that the processor be operating in debug mode, which is not feasible in a run-time environment.

Figure 1:
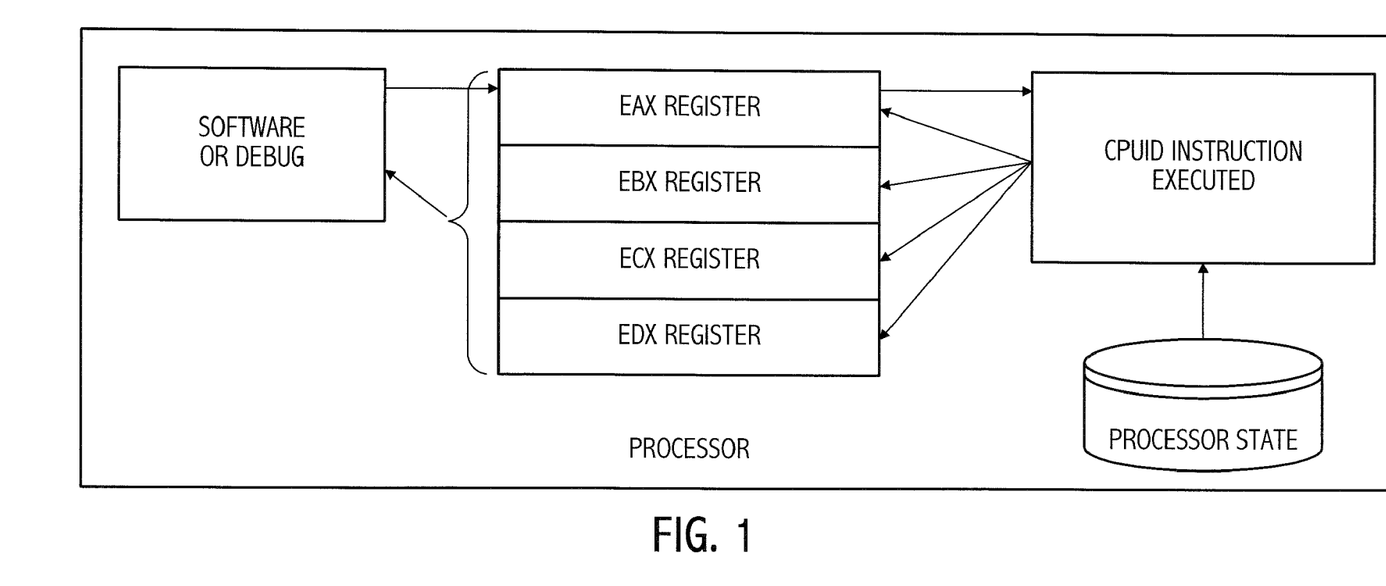
FIG. 1 illustrates a prior art execution of a CPUID command.

During runtime in prior art approaches, processor state information may be obtainable without causing the processor to halt execution; however, obtaining such information may destroy processor state. For example, executing the CPUID command, which obtains a wide variety of processor feature capabilities and configuration information, causes a change to processor state. For example, referring to FIG. 1, software or a debug interface sets the EAX register to the CPUID index. The CPUID index controls the specific information that is returned by execution of the CPUID command. The CPUID instruction is then executed, which takes the EAX register contents (the CPUID index) and utilizes that information to obtain the CPUID information requested. As a result of execution of the CPUID instruction, the EAX, EBX, ECX, and EDX registers are loaded with the specific processor state information requested. That information can then be read by software or from an external debug interface. If this instruction were executed during runtime, i.e., when the processor is executing normally in a system, the change to EAX, EBX, ECX, and EDX registers could cause system instability in currently running software.

SUMMARY

Accordingly, a new approach to non-destructive access to certain processor information is desirable. In an embodiment, a method is provided that includes supplying a processor during runtime via a sideband interface on the processor with a command to read processor state information. Responsive to the command, the processor retrieves requested processor state information from storage elements in the processor and stores the requested processor state information in storage elements local to the sideband interface without affecting processor state.

In another embodiment, a processor is provided that includes a sideband interface responsive to a command received on the sideband interface. First storage locations are local to the sideband interface and separate from processor general purpose registers. Second storage locations store processor state information. A microcode execution engine is responsive to the sideband interface to retrieve processor state information and store the processor state information in the first storage locations local in the sideband interface without modifying one or more general purpose registers in the processor.

BRIEF DESCRIPTION OF THE DRAWINGS

The present invention may be better understood, and its numerous objects, features, and advantages made apparent to those skilled in the art by referencing the accompanying drawings.

Note that the use of the same reference symbols in different drawings indicates similar or identical items.

DESCRIPTION OF THE PREFERRED EMBODIMENT(S)

Figure 2:
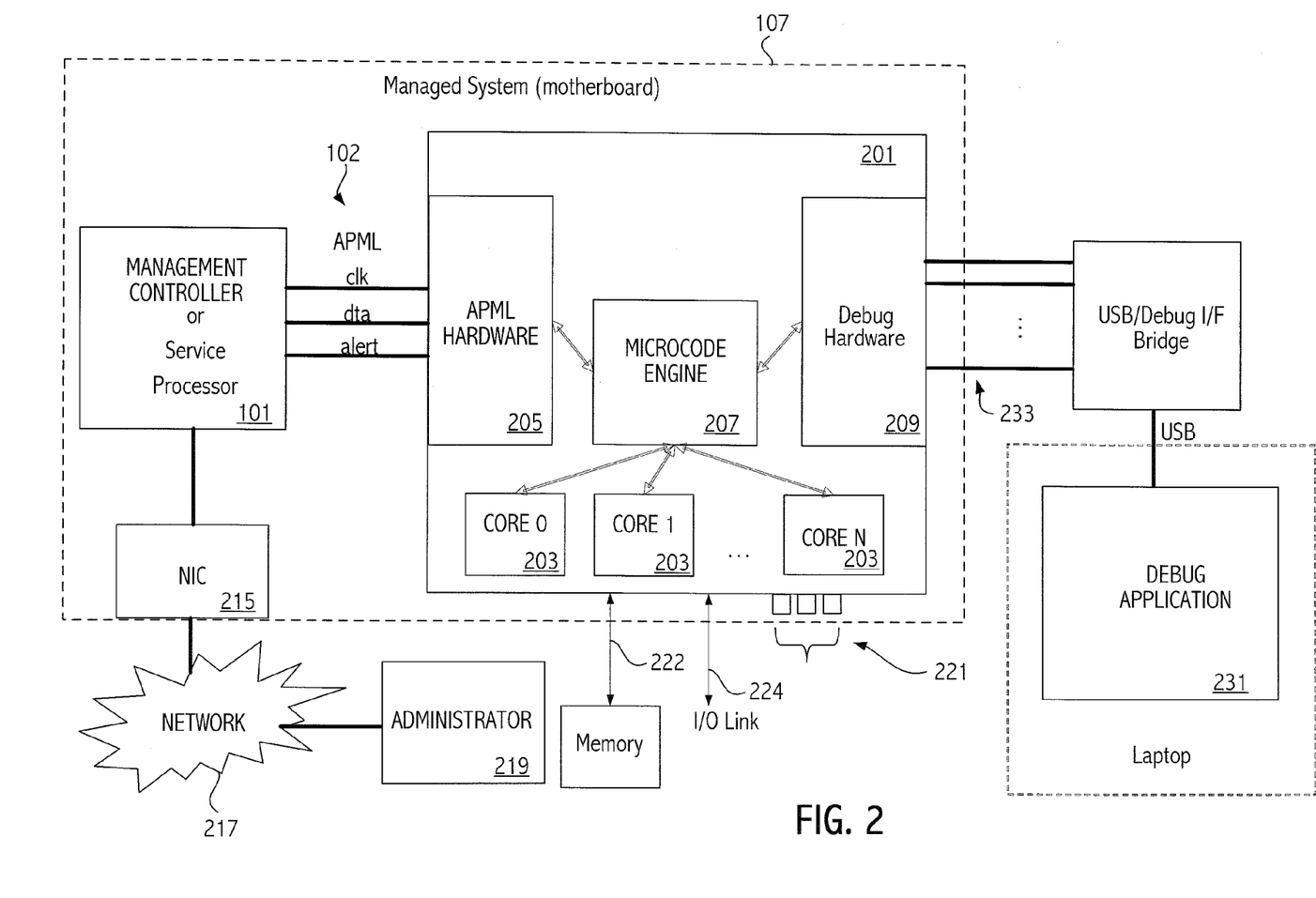
FIG. 2 illustrates a high level block diagram of an exemplary computer system according to an embodiment of the invention.

Referring to FIG. 2, illustrated is a high level block diagram of an exemplary computer system 107 according to an embodiment of the invention. A management controller 101 includes appropriate software/firmware to communicate with processor 201 and perform appropriate management functions. One type of system management controller is known in the art as a baseboard management controller (BMC). BMC's are microcontrollers typically residing on the motherboard of servers, and are coupled to various system sensors. The BMC manages such system functions as temperature, fan speed, power, etc. The BMC provides an interface between system management software and platform hardware. However, in traditional BMC architectures there has been no sideband mechanism to obtain processor state without affecting other processor state information. In contrast, as shown in FIG. 2, the system management controller, according to an embodiment of the invention, includes a sideband communication link 102 directly connecting the management controller 101 to processor 201 that allows processor state information to be retrieved non-destructively as described further herein.

In the exemplary embodiment shown in FIG. 2, the management controller or service processor 101 is coupled via an Advanced Platform Management Link (APML) 102 to an exemplary APML enabled processor 201. APML processor 201 includes multiple cores 203. APML processor 201 includes APML hardware 205, microcode engine 207 and debug hardware 209. In an embodiment, the communication link (APML) 102 includes clock, data, and an alert signal line. The alert signal line allows the processor to signal the management controller of the occurrence of an event. The link 102 may be a point-to-point link between the management controller 101 and the processor 201. The link may be an SMBus or other communication link and may run at various frequencies, e.g., 100 KHz, 400 KHz, 3.4 MHz, or other clock frequency suitable for the particular application. The communication link 102 is used to supply the APML hardware with commands and data and to retrieve data associated with the command, e.g., as a result of a read operation, and provide that data to the management controller 101 for evaluation for management purposes. Note that the term sideband interface is used to contrast to other processor communication links and their interfaces on the processor, such as memory link 222, which couples processor to memory, and I/O link 224, which couples the processor to input/output devices over, e.g., a Hypertransport (HT) communications link. Note that while a single memory link 222 and I/O link 224 is shown in FIG. 2 for processor 201, each core 203 may have its own memory and I/O link. Further, while multiple cores are shown in FIG. 2, the embodiments described herein are applicable to processors with one or more cores. Additionally, while the microcode engine 207 is shown as being used by all the cores in FIG. 2, in some embodiments each core 203 may interface with the APML hardware 205 directly and use its own microcode engine, at least to support some of the APML commands.

The management controller 101 may be coupled through a network interface card (NIC) 215 to network 217 and through network 217 to an administrator 219. The administrator can provide the management controller 101 with information related to processor 201 through the network as described further herein. The administrator can utilize APML's capabilities to read/write processor state information over the network.

The processor 201 includes three address pins 221 that allow the link 102 to select up to eight different processors on a single APML bus segment.

FIG. 2 also shows debug interface 209 coupled to a debug application 231, through a debug bus 233, which may be implemented as a JTAG bus with additional signal lines DBReq and DBRdy. Such an interface is known in the art and implemented, e.g., by AMD Hardware Debug Tool (HDT).

Figure 3:
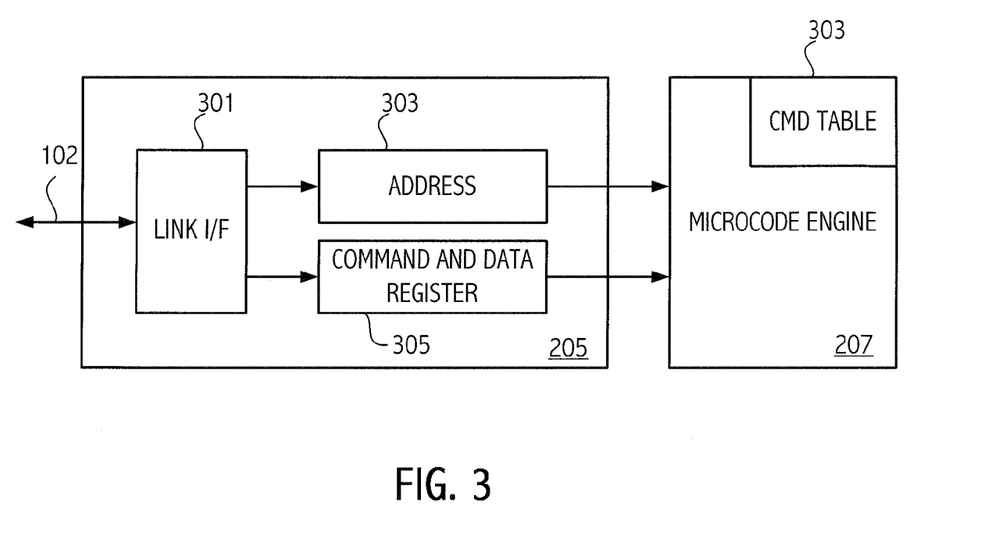
FIG. 3 illustrates additional details of the system of FIG. 2.

Referring to FIG. 3, additional details of the APML block 205 are shown. APML block 205 includes a link interface 301 that implements the protocol necessary to communicate over the link 102. In addition, APML block 205 includes an address register and a command and data register. The address register 303 stores address information sent over the link 102. The command and data register 305 stores command information and data, if appropriate for the particular command, e.g., data associated with a write command. In addition, the command and data register receives data from the microcode engine in response to an executed command, e.g., data read from a particular location in the processor or external to the processor.

The microcode engine 207 receives the commands from the APML block 205 and executes those commands while the microprocessor maintains normal operation, e.g., without halting the processor. The microcode engine, which is conventional, executes the APML commands at appropriate instruction boundaries of regular instructions executed by the microprocessor. The APML commands function similarly to an interrupt mechanism in that the normal flow of microprocessor instructions is halted briefly while the microcode executes the APML command and then the normal microprocessor instructions resume execution at the conclusion of the APML command. Thus, in contrast to certain debug operations, the processor operation is not halted and the processor can maintain normal operations.

Because the APML interface provides access to machine registers, use of the interface may have security implications. Accordingly, in one embodiment, referring now to FIG. 4, the APML interface is divided into multiple interface portions, the thermal sensor interface (TSI) 401, the remote management interface (RMI) 403, and the internal access interface (IAI) 405, which provide access to different registers and information in the processor. The thermal sensor interface (TSI) 401 allows accessing processor thermal information. Thus, digital temperature information from thermal sensors on-board (or accessible to) the processor is available through this interface. The RMI 403 is a public interface to information, such as processor power state limit, machine check registers, and CPUID, that allows for platform and/or processor management functions to access information relating to such attributes as performance and power consumption. Other types of information may also be accessible through the RMI that allow appropriate management of the processor/platform functions. APML TSI and RMI expose processor temperature and basic manageability information which are not considered a violation of secure mode processor operation. Thus, the access provided through both the TSI 401 and the RMI 403 allows access to portions of the processor state information that do not have security implications, at least with respect to secure mode processor operations.

Figure 4:
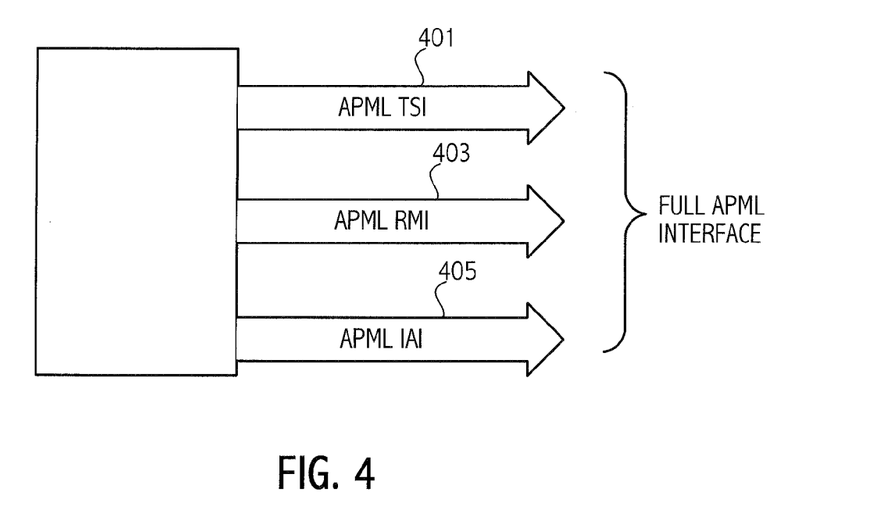
FIG. 4 illustrates multiple interface portions of an exemplary APML interface.

In contrast, the IAI 405 provides access to low level processor and platform state information. For example, in an exemplary embodiment, the IAI provides access to such low level processor and platform state information as general purpose registers, various special purpose registers, machine specific registers (MSRs), various input/output (I/O) including I/O devices, and memory. Of course, any particular embodiment may provide access to additional and/or different low level processor and platform state information. The IAI allows bypassing operating system and hypervisor security mechanisms such as process isolation, access control, user authentication, and hardware and software resource management. Thus, access through the IAI has security implications. Accordingly, various security policies may be utilized in conjunction with the IAI. In an embodiment of the invention, the IAI access is configured in a way that allows trusted software to make policy based decisions to enable or disable processor sideband interfaces in order to foster a proper security model. That allows the sideband interfaces such as the APML interface to perform advanced manageability and reliability, accessibility and serviceability (RAS) functionality during software runtime. Otherwise, sideband interfaces would have to be permanently turned off during run time in order to maintain a proper security model.

Figure 5:
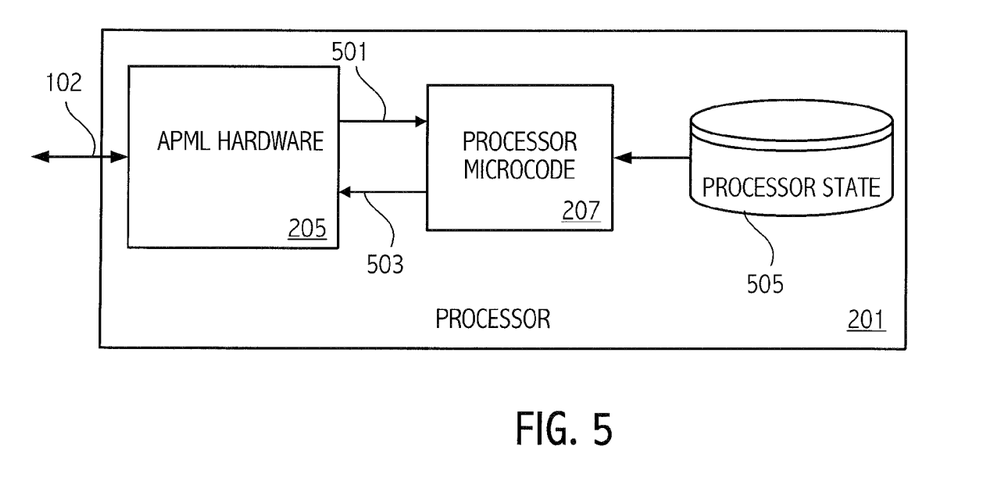
FIG. 5 illustrates an exemplary embodiment for non-destructive reading of processor state information.
Figure 6:
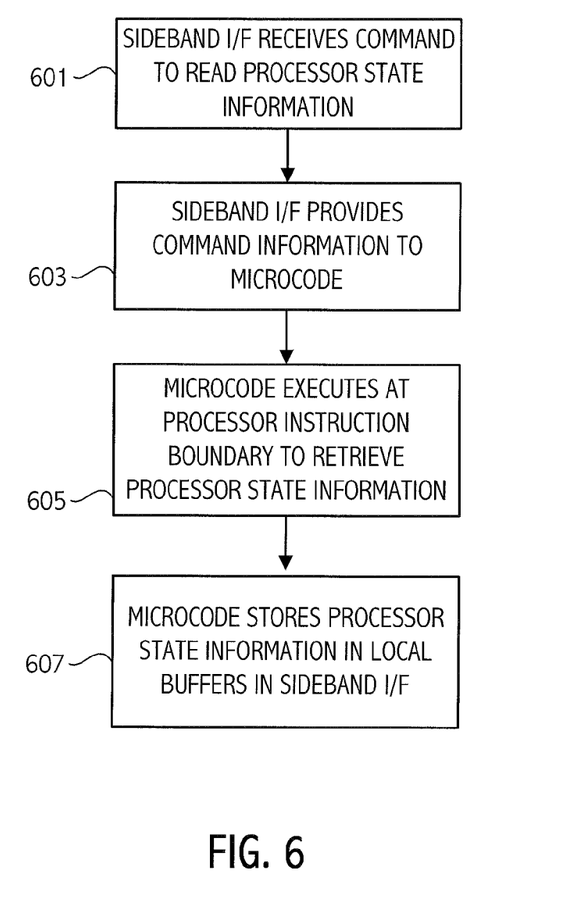
FIG. 6 illustrates an exemplary flow diagram for non-destructive reading of processor state information.

Accessing processor state information during runtime non-destructively through a sideband interface, such as the RMI portion of the APML interface, is provided in various embodiments described herein. By providing such information, system management can be more effective. Referring to FIGS. 5 and 6, an example of obtaining processor state information non-destructively is illustrated. To start the sequence in 601, the management controller 101 (not shown in FIG. 5) sends a command over communication link 102 to the APML interface in APML hardware 205. The command information may, e.g., specify reading particular CPUID information, equivalent to, e.g., CPUID Fn0000_0001. That information is provided to the command and data register 305 in APML hardware 205. In 603, the APML hardware 205 provides the command information to microcode engine 207 over signal lines 501. In 605, the processor microcode 207 executes the retrieve CPUID information at an appropriate CPU instruction boundary and retrieves the processor state information from processor state storage elements 505. Note that some processor state information may be stored in non-volatile memory on the processor, e.g., in fuse locations, and other processor state information may be stored in volatile memory locations on the processor, e.g., in registers. In 607, the processor microcode then supplies the retrieved processor state information over signal lines 503 for storage in local buffers in the APML hardware 205, e.g., in the command and data registers, or other buffers as required. In that way, the microcode does not modify the general purpose registers when retrieving the CPUID information, thus maintaining processor state intact. In this example, CPUID Fn0000_0001 retrieves processor identification information of processor family, model, and stepping information. Note that other embodiments contemplate obtaining other processor state information that would be useful for system management or debug and is not limited to just information corresponding to execution of CPUID commands. After the microcode engine completes retrieval of the information and the APML command is complete, execution immediately returns to the normal flow in the processor similar to returning from an interrupt. Thus, the processor state information may be obtained during normal runtime operations without significantly disrupting the processor execution flow. Note that it may be of interest to obtain other types of state information non-destructively, e.g., machine check registers, instruction pointer, or performance monitors, depending on the design of the processor and the needs of the system.

Figure 7:
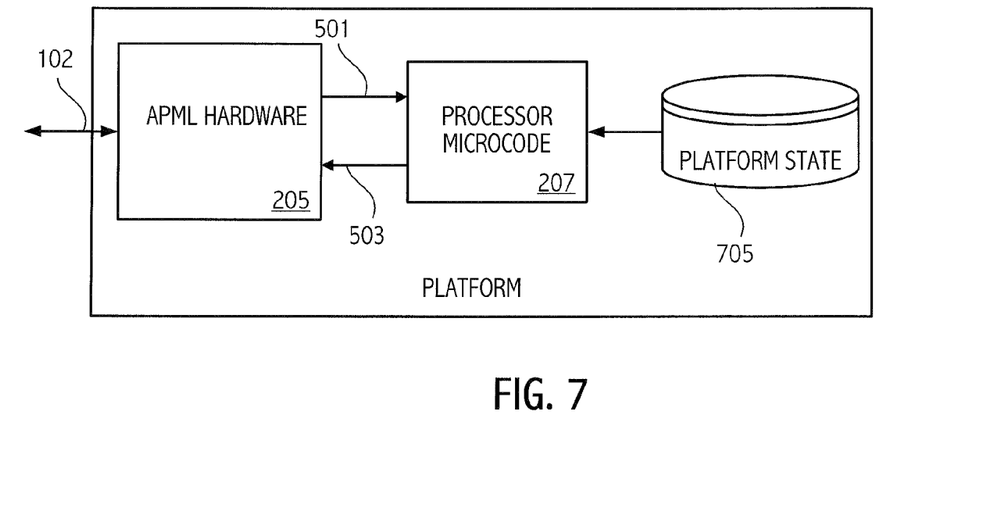
FIG. 7 illustrates an exemplary embodiment for non-destructive reading of platform state information.
Figure 8:
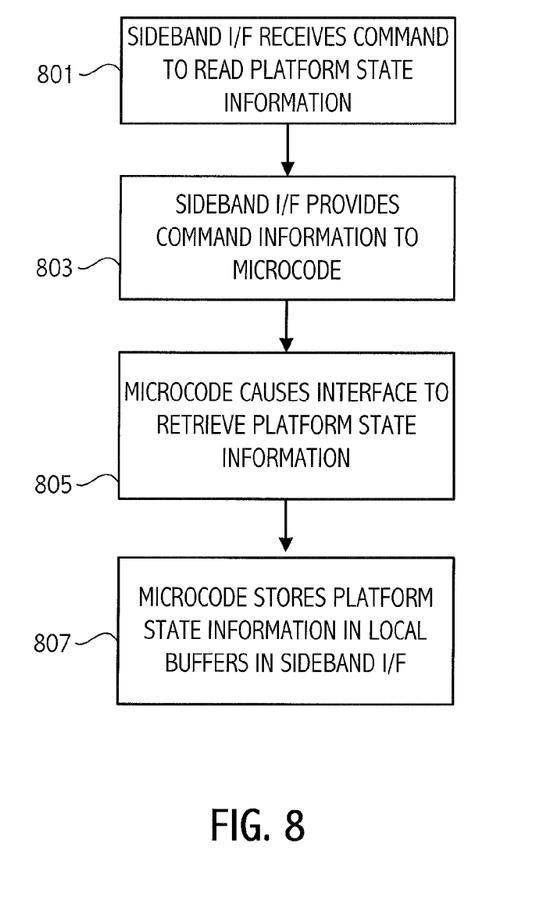
FIG. 8 illustrates an exemplary flow diagram for non-destructive reading of platform state information.

Referring again to FIG. 2, while processor state information may be retrieved by the sideband interface 205, the microcode engine may operate in accordance with FIG. 7 to retrieve platform state information via memory interface 222 or I/O interface 224. As used herein, platform state information can include both processor state information or information that is external to the processor state. Thus, in accordance with FIG. 8, at 801, the sideband interface receives a command to retrieve platform state information. The microcode engine receives a command from the APML interface 205 at 803. In response to the command at 805, the microcode engine causes system memory interface (not shown in FIG. 2) to retrieve a specified address location from system memory and store the retrieved information in APML interface hardware registers in 807 without affecting the general purpose registers. In addition, in an embodiment, the microcode engine can retrieve information over the I/O interface and store the retrieved information in sideband registers without affecting processor state, e.g., without affecting the general purpose registers.

The description of the invention set forth herein is illustrative, and is not intended to limit the scope of the invention as set forth in the following claims. For example, while the APML interface has been specifically described as the exemplary sideband interface that implements a non-destructive read, other sideband interfaces including debug interfaces may implement the non-destructive read described herein. Other variations and modifications of the embodiments disclosed herein may be made based on the description set forth herein, without departing from the scope and spirit of the invention as set forth in the following claims.

What is claimed is:

1. A method comprising:
 supplying a processor during runtime via a sideband interface on the processor with a command to read processor state information;
 responsive to the command, the processor retrieving requested processor state information from storage elements in the processor; and
 storing the requested processor state information in storage elements local to the sideband interface without affecting processor state.

2. The method as recited in claim 1 wherein the processor state information identifies at least one of processor features or capabilities.

3. The method as recited in claim 2 wherein the processor state information corresponds to information from a CPUID command.

4. The method as recited in claim 1 further comprising supplying the processor state information through the sideband interface to a device that sent the command.

5. The method as recited in claim 1 further comprising the processor responding to the command by executing microcode to obtain the processor state information.

6. The method as recited in claim 1 wherein the processor state information is obtained without modifying general purpose registers in the processor.

7. The method as recited in claim 1, further comprising storing the processor state information in non-volatile storage elements in the processor.

8. The method as recited in claim 1 further comprising:
 interrupting execution of processor instructions to retrieve the processor state information; and
 returning to execution of processor instructions immediately upon completing the storing of the requested processor state information.

9. A processor comprising:
 a sideband interface responsive to a command received on the sideband interface;
 first storage locations local to the sideband interface and separate from processor general purpose registers;
 second storage locations for storing processor state information; and
 a microcode execution engine responsive to the sideband interface to retrieve processor state information and store the processor state information in the first storage locations without modifying one or more general purpose registers in the processor.

10. The processor as recited in claim 9 wherein the processor state information retrieved is processor identification information.

11. The processor as recited in claim 9 wherein the processor state information corresponds to information associated with a CPUID command.

12. The processor as recited in claim 9 further comprising non-volatile memory storing the processor state information.

13. The processor as recited in claim 9 further comprising volatile memory to store the processor state information.

14. A method comprising:
 supplying a processor during runtime via a sideband interface on the processor with a command to read platform state information;
 responsive to the command, the processor retrieving requested platform state information from storage elements in the platform; and
 storing the requested platform state information in storage elements local to the sideband interface without affecting processor state.

15. The method as recited in claim 14 wherein the platform state information includes at least one of information external to the processor and information internal to the processor.

16. The method as recited in claim 14 wherein the platform state information includes information from system memory.

17. The method as recited in claim 14 wherein the platform state information includes information received over an input/output communications link coupled to the processor.

18. A processor comprising:
   a sideband interface responsive to a command received on the sideband interface;
   first storage locations local to the sideband interface and separate from processor general purpose registers; and
   a microcode execution engine responsive to the sideband interface to retrieve platform state information and store the platform state information in the first storage locations without modifying one or more general purpose registers in the processor.

19. The processor as recited in claim 18 wherein the platform state information retrieved is from system memory.

20. The processor as recited in claim 18 wherein the platform state information includes information received over an input/output communications link coupled to the processor.

* * * * *